United States Patent
Hwang et al.

(10) Patent No.: US 8,046,523 B2
(45) Date of Patent: Oct. 25, 2011

(54) FLASH MEMORY MANAGEMENT SYSTEM AND APPARATUS

(75) Inventors: Joo-young Hwang, Suwon-si (KR); Kyu-ho Park, Daejeon (KR); Seung-ho Lim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 11/705,430

(22) Filed: Feb. 13, 2007

(65) Prior Publication Data

US 2007/0192534 A1 Aug. 16, 2007

Related U.S. Application Data

(60) Provisional application No. 60/772,586, filed on Feb. 13, 2006.

(30) Foreign Application Priority Data

Feb. 1, 2007 (KR) .................. 10-2007-0010469

(51) Int. Cl.
 *G06F 12/00* (2006.01)
 *G11C 16/10* (2006.01)

(52) U.S. Cl. ............. 711/103; 711/206; 711/E12.001; 711/E12.059; 707/726; 707/824; 707/E17.01

(58) Field of Classification Search .............. 711/103; 707/200, 205
See application file for complete search history.

(56) References Cited

U.S. PATENT DOCUMENTS

| | | | | |
|---|---|---|---|---|
| 5,717,886 | A * | 2/1998 | Miyauchi | 711/103 |
| 5,996,054 | A * | 11/1999 | Ledain et al. | 711/203 |
| 6,571,259 | B1 * | 5/2003 | Zheng et al. | 707/205 |
| 6,574,591 | B1 * | 6/2003 | Kleiman et al. | 707/203 |
| 6,587,915 | B1 * | 7/2003 | Kim | 711/103 |
| 6,643,654 | B1 * | 11/2003 | Patel et al. | 711/100 |
| 2003/0165076 | A1 * | 9/2003 | Gorobets et al. | 365/200 |
| 2003/0182330 | A1 * | 9/2003 | Manley et al. | 707/205 |
| 2003/0182389 | A1 * | 9/2003 | Edwards | 709/213 |
| 2004/0210706 | A1 * | 10/2004 | In et al. | 711/103 |
| 2005/0015354 | A1 * | 1/2005 | Grubbs et al. | 707/1 |
| 2005/0114297 | A1 * | 5/2005 | Edwards | 707/1 |
| 2005/0154818 | A1 | 7/2005 | Chen | |
| 2005/0289152 | A1 * | 12/2005 | Earl et al. | 707/100 |
| 2009/0112950 | A1 * | 4/2009 | Ejiri | 707/205 |

FOREIGN PATENT DOCUMENTS

CN 1290014 A 4/2001

* cited by examiner

*Primary Examiner* — Reginald Bragdon
*Assistant Examiner* — Daniel Bernard
(74) *Attorney, Agent, or Firm* — Sughrue Mion, PLLC

(57) ABSTRACT

Provided are a flash memory management apparatus and method which divide blocks of a memory into data blocks and i-node blocks and respectively specify storage paths of data, which is stored in the data blocks, in the i-node blocks in order to easily access pieces of the data by searching the i-node blocks. The flash memory management apparatus includes a map search module searching for a map block located at a preset position of a memory among blocks that form the memory and extracting storage paths of one or more i-node blocks; a path search module searching for storage paths of data specified in the i-node blocks based on the extraction result; and a data management module accessing the data through a storage path of the data and performs a transaction on the data.

16 Claims, 12 Drawing Sheets

FIG. 5

| | | | |
|---|---|---|---|
| I-NODE BLOCK LIST 0 | UNMOUNT FLAG | NUMBER OF I-NODE BLOCKS | LIST SIZE |
| I-NODE BLOCK LIST 1 | UNMOUNT FLAG | NUMBER OF I-NODE BLOCKS | LIST SIZE |
| I-NODE BLOCK LIST 2 | UNMOUNT FLAG | NUMBER OF I-NODE BLOCKS | LIST SIZE |
| ⋮ | ⋮ | ⋮ | ⋮ |

| PAGE SIZE | SIZE OF METADATA | NUMBER OF INDEX ENTRIES | RANGE OF FILE SIZES ||
| | | | DIRECT REFERENCE I-NODE | INDIRECT REFERENCE I-NODE |
|---|---|---|---|---|
| 512 bytes | 256 bytes | 64 | 32 KB | 12 MB |
| 2 KB | 256 bytes | 448 | 896 KB | 960 MB |

| FILE/TRANSACTION RATIO | ADDITIONAL WRITE FREQUENCY FOR GARBAGE COLLECTION | | | |
|---|---|---|---|---|
| | EXT2 Over NFTL | EXT2 Over FTL | YAFFS | PRESENT INVENTION |
| 1 : 10 | 3.37 | 0.70 | 0.30 | 0.26 |
| 1 : 3 | 3.69 | 0.69 | 0.17 | 0.15 |
| 1 : 2 | 247 | 0.71 | 0.15 | 0.12 |

| PARAMENT | JFFS2 | YAFFS | PRESENT INVENTION |
|---|---|---|---|
| SCANNING TIME | 22.6 s | 3.00 s | 593 ms |
| POSTMARK/TRANSACTION RATIO | 0.426 | 0.485 | 0.487 |
| PAGE WRITING FREQUENCY | 69105 | 68055 | 68577 |
| ADDITIONAL WRITE FREQUENCY FOR GARBAGE COLLECTION | 0.139 | 0.148 | 0.119 |

FLASH MEMORY MANAGEMENT SYSTEM AND APPARATUS

CROSS REFERENCE OF THE APPLICATION

This application claims priority from Korean Patent Application No. 10-2007-0010469 filed on Feb. 1, 2007 in the Korean Intellectual Property Office, and U.S. Provisional Patent Application No. 60/722,586 filed on Feb. 13, 2006 in the United States Patent and Trademark Office, the disclosures of which are incorporated herein by reference in their entirety.

BACKGROUND OF THE INVENTION

1. Field of the Invention

Apparatuses and methods consistent with the present invention relate to a flash memory management, and more particularly, to a flash memory management apparatus and method which divide blocks of a memory into data blocks and i-node blocks and respectively specify storage paths of a data, which are stored in the data blocks, in the i-node blocks in order to easily access the pieces of data by searching the i-node blocks.

2. Description of the Related Art

Flash memories are constantly-powered nonvolatile memories which can be erased and reprogrammed in units of blocks. Flash memories are a variation of electrically erasable programmable read-only memories (EEPROMs). While EEPROMs can be erased and rewritten at the byte level, flash memories can be rewritten in units of blocks. Therefore, flash memories are faster than EEPROMs.

A flash memory gets its name since the microchip is organized such that a section of memory cells are erased in a single action or flash. The erasure is caused by Fowler-Nordheim tunneling in which electrons pierce through a thin dielectric material to remove an electric charge from a floating gate associated with each memory cell.

A flash memory is not a passive device, such as a dynamic random access memory (DRAM), which includes a simple memory device, a refresh circuit, and an error correction circuit. Instead, the flash memory is an active device which receives commands from a programmer and executes the received commands. The commands are issued using a command user interface (CUI), and the entire state of a system is managed by a write state machine (WSM). Examples of the commands include read, write, and other control commands.

Nonvolatile memories, such as flash memories, have the advantages of both random access memories (RAMs), which can freely write and erase data, and read only memories (ROMs) which can retain stored data without power supply. Therefore, the nonvolatile memories are widely used as storage media of handheld electronic devices such as digital cameras, personal digital assistants (PDAs), and MP3 players.

Similar to related art RAMs or magnetic tapes, nonvolatile memories allow random access to data stored at a predetermined location. However, unlike the related art storage devices, the nonvolatile memories rewrite or erase data in units of erase blocks (hereinafter, referred to as "blocks").

That is, when data is to be corrected, a block including the data is erased, and then the data is rewritten. It is just like deleting a word by pressing a delete key and then rewriting it instead of correcting letters or alphabets in the word one by one.

FIG. 1 illustrates the structure of a related art nonvolatile memory 100. Referring to FIG. 1, the related art nonvolatile memory 100 includes a plurality of blocks 110, and each of the blocks 110 includes a plurality of pages 200.

FIG. 2 illustrates the structure of one of the pages 200 illustrated in FIG. 1. The pages 200 are basic units of reading and writing operations. Each of the pages 200 may be divided into a data region 210 and a spare region 220. The data region 210 stores data, and the spare region 220 records an offset of a logical page which is recorded in a corresponding physical page.

The data region 210 of each of the pages 200 records 512 bytes of data. A file identification (ID) and a chunk number are assigned to each of the pages 200 and recorded in the spare region 220. In addition, two-bit serial numbers are assigned to the pages 200 as the positions of the pages 200 increase. Therefore, even when the same chunk number is assigned to two pages due to a power failure, a hitch or other errors, the pages can be distinguished from each other.

As described above, the spare region 220 exists in each of the pages 200, and information stored in the spare region 220 is used to retrieve data stored in the memory 100. That is, when a user or an apparatus desires to retrieve data stored in the memory 100, the spare regions 220 of the pages 200 are all scanned in order to extract the position of the data.

As the demands for flash memories increase, the integration density of the flash memories has also increased to tens of gigabytes. In order to initialize a memory having a structure as described above, a page can be accessed only after all spare regions of the memory are scanned, which may take more than tens of seconds.

Therefore, there exists a need for easily accessing a target page without scanning the entire memory.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a flash memory management apparatus and method which divide blocks of a memory into data blocks and i-node blocks and respectively specify storage paths of a data, which is stored in the data blocks, in the i-node blocks in order to easily access the pieces of data by searching the i-node blocks.

The present invention also provides a flash memory management apparatus and method which correspond a different i-node to each file according to file size.

According to an aspect of the present invention, there is provided a flash memory management apparatus including a map search module searching for a map block located at a preset position of a memory among blocks that form the memory and extracting storage paths of one or more i-node blocks; a path search module searching for storage paths of a data specified in the i-node blocks based on the extraction result; and a data management module accessing the data through a storage path of the data and performs a transaction on the data.

According to another aspect of the present invention, there is provided a flash memory management method including searching for a map block located at a preset position of a memory among blocks that form the memory and extracting storage paths of one or more i-node blocks; searching for storage paths of a data specified in the i-node blocks based on the extraction result; and accessing the data through a storage path of the data and performs a transaction on the data.

BRIEF DESCRIPTION OF THE DRAWINGS

The above and other aspects of the present invention will become more apparent by describing in detail exemplary embodiments thereof with reference to the attached drawings in which:

FIG. 5 illustrates a detailed configuration of a map block according to an exemplary embodiment of the present invention;

FIGS. 1 through 13 are graphs illustrating the results of garbage collection performance tests conducted using conventional flash memory management methods and a flash memory management method according to an exemplary embodiment of the present invention;

FIG. 14 is a table showing the results of the performance tests of FIGS. 11 through 13; and FIG. 15 is a table showing the results of another performance tests conducted using related art flash memory management methods and a flash memory management method according to an exemplary embodiment of the present invention.

DETAILED DESCRIPTION OF EXEMPLARY EMBODIMENTS OF THE INVENTION

Figure 1:
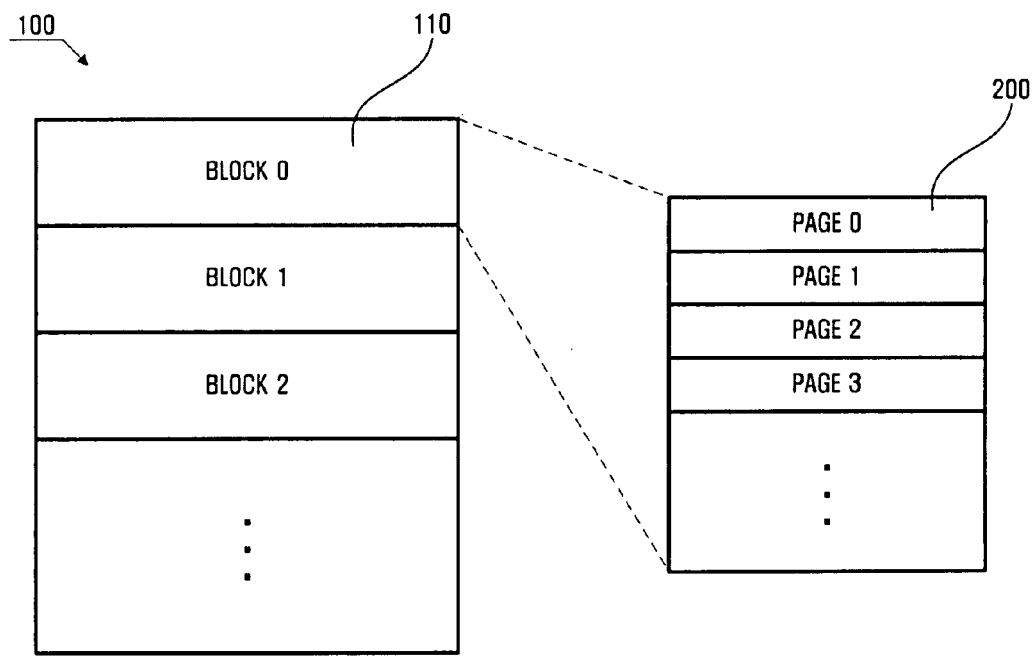
FIG. 1 illustrates the structure of a related art nonvolatile memory.
Figure 2:
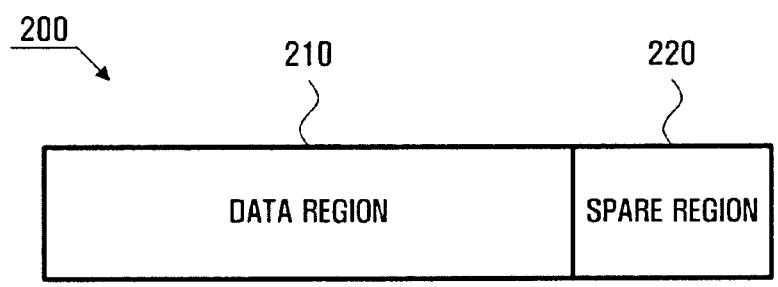
FIG. 2 illustrates the structure of a related art page.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

Hereinafter, exemplary embodiments of the present invention will be described in detail with reference to the accompanying drawings.

Figure 3:
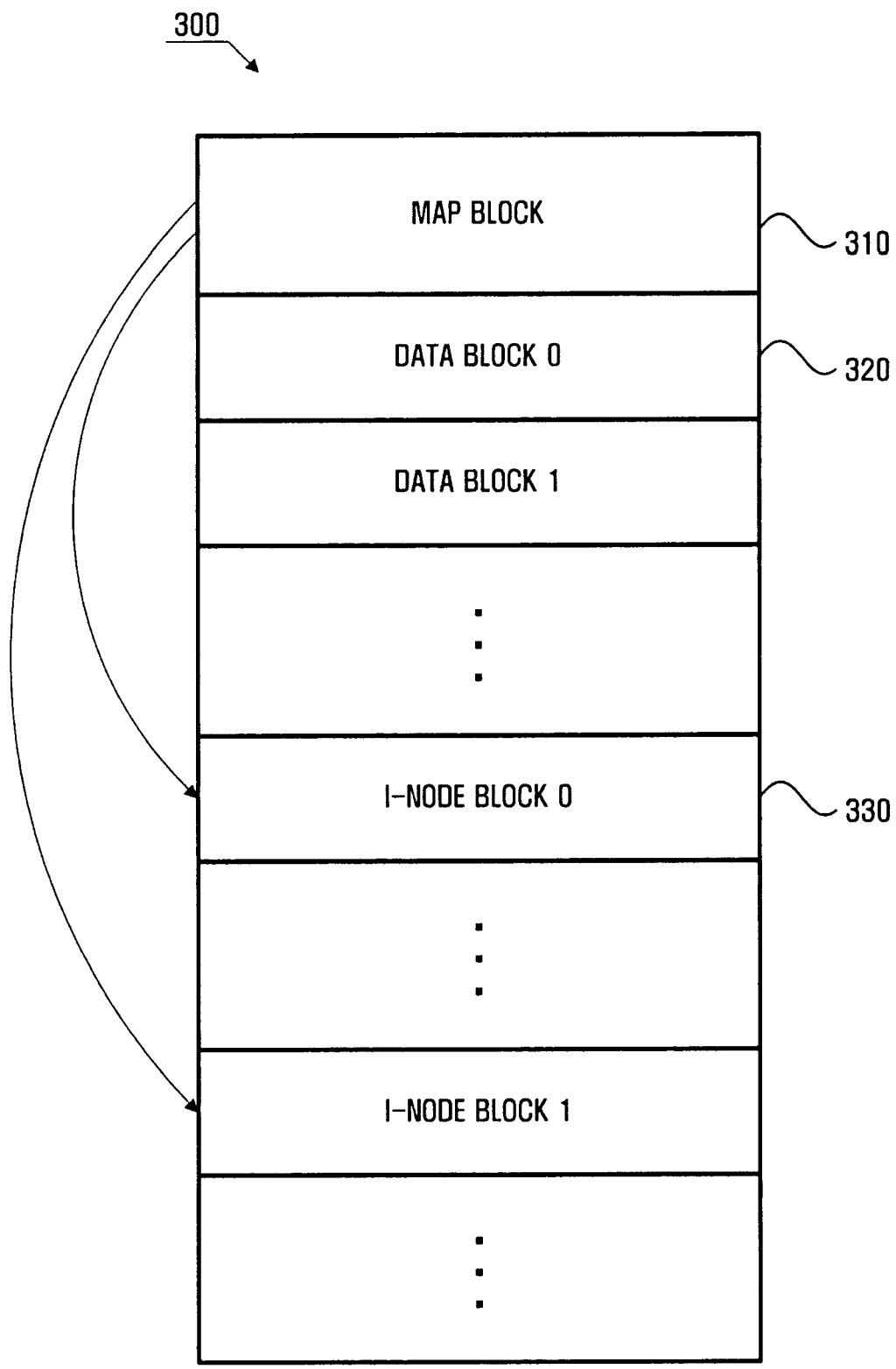
FIG. 3 illustrates the structure of a memory according to an exemplary embodiment of the present invention.

FIG. 3 illustrates the structure of a memory 300 according to an exemplary embodiment of the present invention. Referring to FIG. 3, the memory 300 includes a map block 310, one or more data blocks 320, and one or more i-node blocks 330.

The data blocks 320 store data. That is, a data region of each page (hereinafter, referred to as a "data page") included in each of the data blocks 320 stores data.

The i-node blocks 330 store storage paths of a data. That is, a data region of each page (hereinafter, referred to as an i-node page) included in each of the i-node blocks 330 stores an address, i.e., an index entry, of a data page in which data is stored. The i-node blocks 330 also store metadata. In the present invention, an i-node includes metadata and index entries, and an i-node is allocated to an i-node page. An index entry denotes a storage path of data and may be understood as an address of a data page of one of the data blocks 320.

The metadata includes an i-node number, a user ID of a file owner, a group ID of the file owner, file size, block size, a last access time, a last correction time, an i-node correction time, file name, and an i-node of an upper layer.

The map block 310 stores storage paths of the i-node bocks 330. That is, a data region of each page included in the map block 310 stores the storage path of each of the i-node blocks 330. Hereinafter, a list of the storage paths of the i-node blocks 330 will be referred to as an "i-node map".

The map block 310 may be located at a predetermined position, preferably, at the head, of the memory 300. When a flash memory management apparatus is powered and thus initialized, it first has to refer to the i-node map stored in the map block 310. If the position of the map block 310 is fixed, there is no need for the flash memory management apparatus to search for the map block 310.

In order to mount a file system, metadata should be referred to. In the exemplary embodiments, blocks storing metadata are separated from blocks storing data. Therefore, the flash memory management apparatus may extract the i-node blocks 330 with reference to the i-node map and search for the blocks storing the metadata, that is, the i-node blocks 330. Then, the flash memory management apparatus can refer to the metadata stored in the i-node blocks 330.

In addition, since the storage paths of the pieces of data are specified in the i-node blocks 330, the flash memory management apparatus may extract the i-node blocks 330 with reference to the i-node map and thus perform initialization faster.

As a system including the flash memory management apparatus operates, the storage paths of the pieces of data stored in the data blocks 320 may be modified at any time. The flash memory management apparatus stores, in the i-node map, the state of the memory 300 when the file system is unmounted. Accordingly, when the file system is mounted later, the flash memory management apparatus can identify the state of the memory 300 based on the i-node node map.

Figure 4:
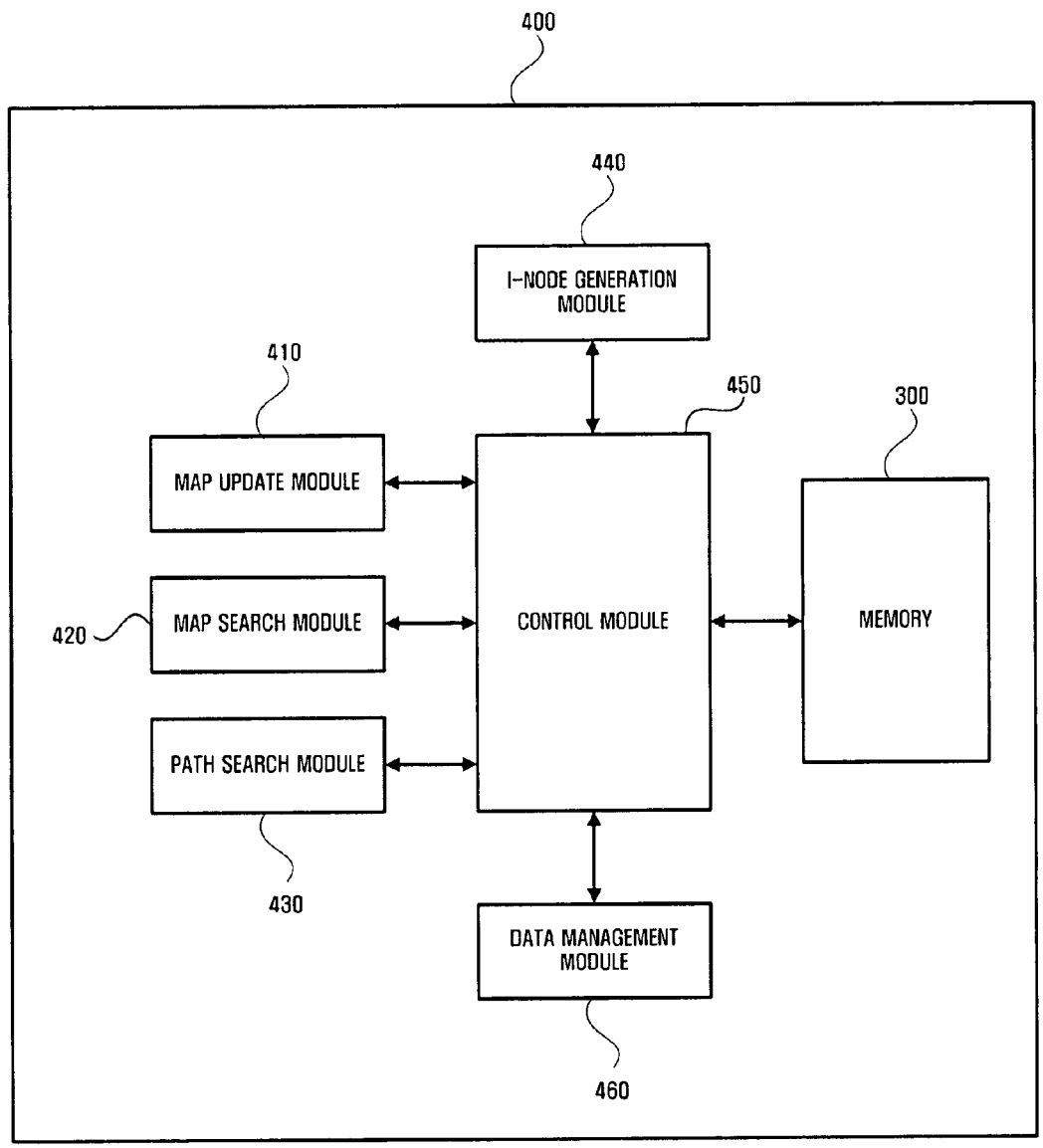
FIG. 4 is a block diagram of a flash memory management apparatus according to an exemplary embodiment of the present invention.

FIG. 4 is a block diagram of a flash memory management apparatus 400 according to an exemplary embodiment of the present invention. Referring to FIG. 4, the flash memory management apparatus 400 includes a map update module 410, a map search module 420, a path search module 430, an i-node generation module 440, a control module 450, a data management module 460, and a memory 300.

The map update module 410 updates an i-node map stored in a map block 310. If the flash memory management apparatus 400 manages the memory 300, the storage path of the memory 300 may be changed as reading, writing, and erasing operations are performed. The map update module 410 updates the i-node map by reflecting such changes.

Whenever the storage path of the memory 300 is changed, the map update module 410 may update the i-node map. Alternatively, the map update module 410 may update the i-node map when a file system is unmounted.

The map search module 420 searches for the map block 310 and extracts storage paths of one or more i-node blocks 330. That is, the map search module 420 extracts the storage paths of the i-node blocks 330 with reference to the i-node map stored in each page of the map block 310.

The path search module 430 searches for i-nodes stored in each of the i-node blocks 330 with reference to the extraction result of the map search module 420. That is, the path search module 430 accesses the i-node blocks 330 based on the i-node map received from the map search module 420, scans i-node pages included in each of the i-node blocks 330, and searches an i-node stored in each i-node page. As the i-nodes are searched, metadata and index entries included therein can be referred to.

As described above, the i-node map is updated when the file system is unmounted. The i-node map may not be properly updated when the system including the flash memory management apparatus 400 is terminated abnormally or when the system malfunctions. The map search module 420 determines whether the i-node map has been properly updated and transmits the determination result to the path search module 430. If the i-node map has not been updated properly, the path search module 430 cannot receive the storage paths of the i-node blocks 330.

If the path search module 430 does not receive the storage paths of the i-node blocks 330 from the map search module 420, it searches for the i-node blocks 330 on its own. That is, the path search module 430 scans all blocks of the memory 300 in search of the i-node blocks 330. In this case, the path search module 430 scans not all pages of each block, but a spare region of a page located at the head of each block. The spare region of the page located at the head of each block of the memory 300 specifies the type of a corresponding block. Using this information, the path search module 430 searches for the i-node blocks 330.

The i-node generation module 440 generates i-nodes and thus updates the i-node pages of the i-node blocks 330. One or more blocks in memory 300 may be preset as the i-node blocks 330 and the i-node blocks 330 may be generated or erased at any time as the flash memory management apparatus 400 operates. Therefore, if the i-node blocks 330 do not exist, the i-node generation module 440 may set those of the blocks of the memory 300, which are not being used, as the i-node blocks 330 and insert the generated i-nodes into the i-node pages.

The data management module 460 accesses data through a storage path of the data received from the path search module 430 and performs a transaction on the data. The transaction includes at least one of reading, writing, generating, and erasing data.

The control module 450 is directly connected to the memory 300 and controls the memory 300 using the map update module 410, the map search module 420, the path search module 430, the i-node generation module 440, and the data management module 460. In addition, the control module 450 controls each module of the flash memory management apparatus 400.

FIG. 5 illustrates a detailed configuration of a map block 310 according to an exemplary embodiment of the present invention. Referring to FIG. 5, each page of the map block 310 includes an i-node block list 510, an unmount flag 520, a number of i-node blocks 530, and a list size 540.

The i-node block list 510 may be stored in a data region of each page of the map block 310, and different information may be stored in each page. In addition, the unmount flag 520, the number of i-node blocks 530, and the list size 540 may be stored in a spare region of each page. The same information may be stored in all pages.

The i-node block list 510 stores an i-node map for all i-node blocks 330 of the memory 300. The map search module 420 extracts the i-node map from the i-node block list 510 and then extracts the storage paths of the i-node blocks 330.

The unmount flag 520 stores a flag indicating whether a file system has been unmounted normally. For example, if the file system has been unmounted normally, the unmount flag 520 has a value of one. If the file system has been unmounted abnormally, the unmount flag 520 has a value of zero. The map search module 420 determines whether the file system has been unmounted normally and whether the i-node map has been updated normally based on the unmount flag 520.

The number of i-node blocks 530 indicates the number of i-node blocks specified in the entire pages of the map block 310, and the list size 540 specifies the size of a page allocated to configure the i-node map. The number of i-node blocks 530 and the list size 540 may be used when the map search module 420 searches for the i-node map.

Figure 6:
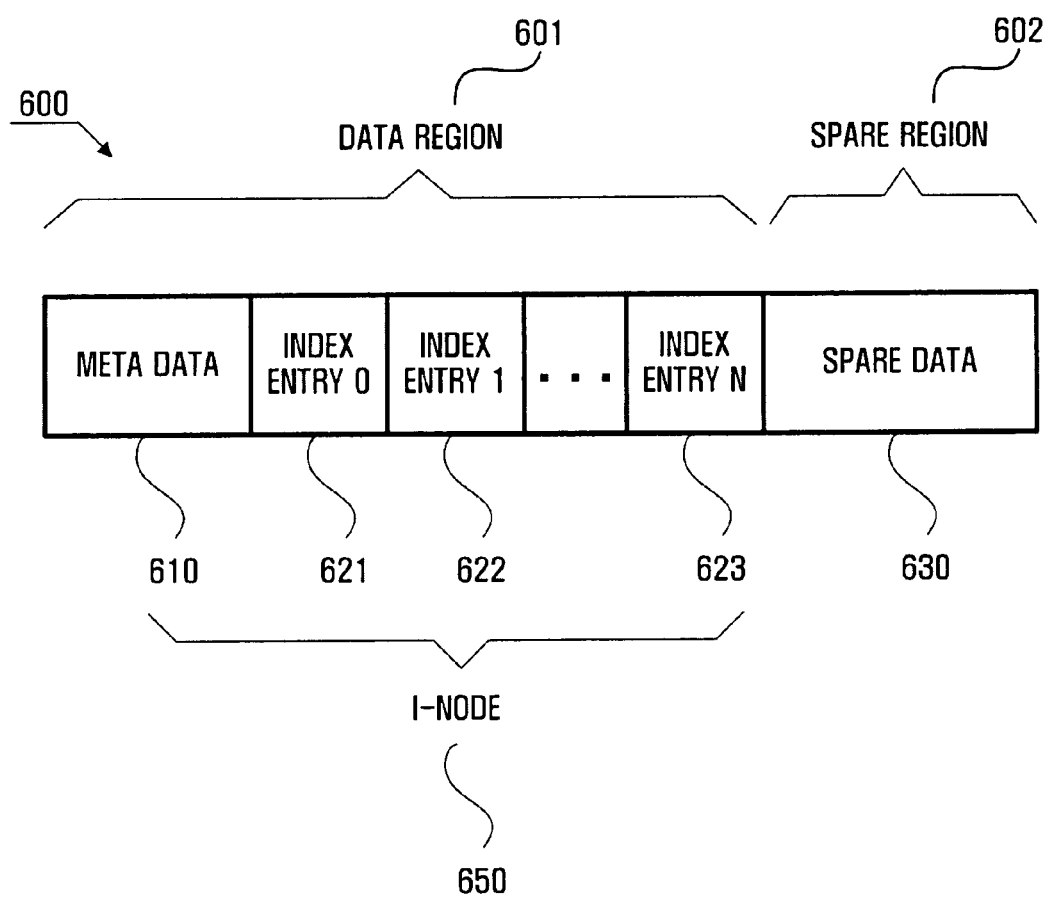
FIG. 6 illustrates the structure of an i-node page of an i-node block according to an exemplary embodiment of the present invention.

FIG. 6 illustrates the structure of an i-node page 600 of an i-node block 330 according to an exemplary embodiment of the present invention. The i-node page 600 of the i-node block 330 is divided into a data region 601 and a spare region 602.

The data region 601 stores metadata 610 and one or more index entries 621 through 623, and the spare region 602 stores spare data 630.

The spare data 630 includes an offset of a logical page which is recorded in a corresponding physical page, a file ID, a chunk number, and a serial number. The path search module 430 refers to the spare data 630 in order to extract the storage path of data.

Spare data of a page located at the head of each block of the memory 300 may include a flag (hereinafter, referred to as a "type flag") indicating the type of a corresponding block. The spare data 630 of the i-node page 600 located at the head of the i-node block 330 may include a type nag indicating that the i-node block 330 is an i-node. Accordingly, if the map search module 420 cannot search for the i-node map because the file system has been unmounted abnormally, the path search module 430 can search for the i-node block 330 using the type flag.

A file may be small enough to be allocated to a data page of a data block 320 or large enough to be allocated to a plurality of data pages of the data block 320. In the present invention, the i-node 650 is classified into a direct reference i-node and an indirect reference i-node according to the size of file.

The direct reference i-node includes one or more index entries which respectively specify storage paths of one or more data pages included in the data block, so that the data pages can be directly referred to. On the other hand, the indirect reference i-node includes one or more index entries which respectively specify storage paths of one or more i-node pages that refer to the data pages included in the data block 320.

That is, while the index entries of the direct reference i-node respectively specify the storage paths of the data pages of the data block 320, the index entries of the indirect reference i-node respectively specify storage paths of one or more i-node pages of another i-node block. The i-node pages of the i-node block may include index entries which specify the storage paths of the data pages of the data block 320 or index entries which specify storage paths of i-node pages of another i-node block.

Figure 7:
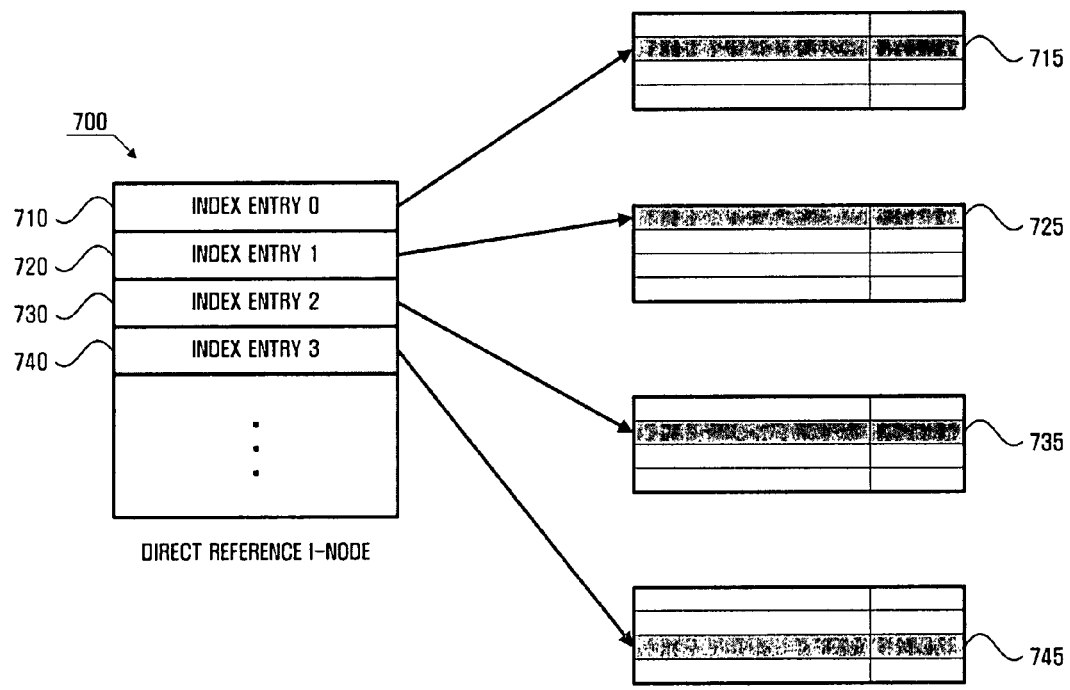
FIG. 7 illustrates a direct reference i-node according to an exemplary embodiment of the present invention.

FIG. 7 illustrates a direct reference i-node 700 according to an exemplary embodiment of the present invention. Referring to FIG. 7, index entries 710 through 740 included in the direct reference i-node 700 respectively refer to data pages 715 through 745. The data pages 715 through 745, which are referred to, may be included in a block or a plurality of different blocks.

Each of the index entries 710 through 740 of the direct reference i-node 700 specifies a storage path of part of data that forms one file. The path search module 430 may refer to the data pages 715 through 745 respectively included in a plurality of data blocks 320 using the index entries 710 through 740 included in the direct reference i-node 700. Hence, a file can be completed using a plurality of pieces of data that are extracted based on the direct reference i-node 700.

Figures 8, 9:
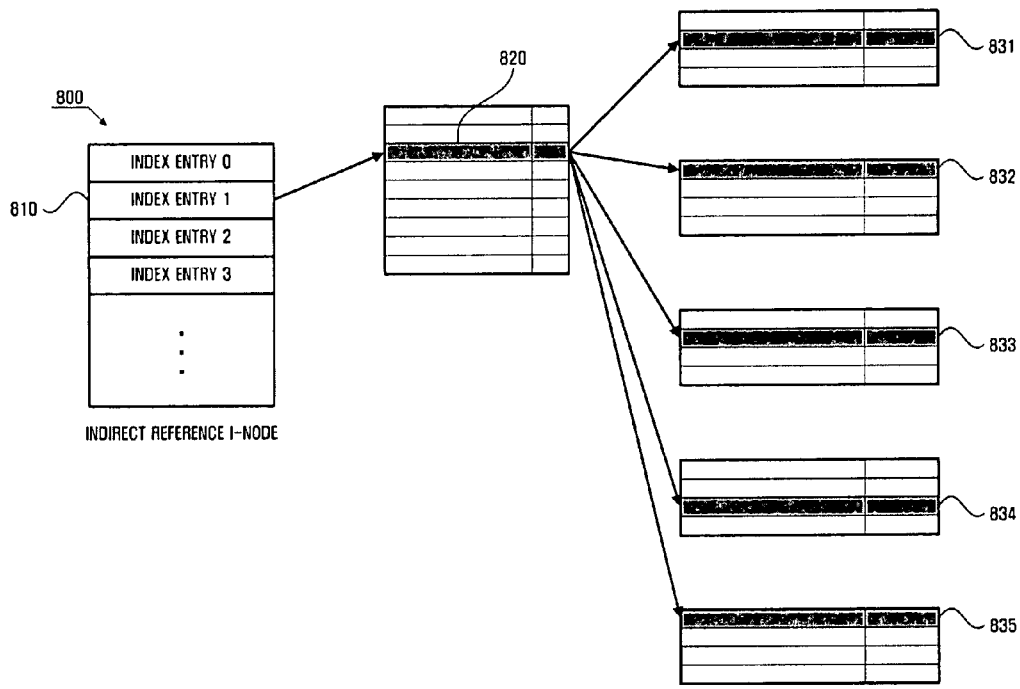
FIG. 8 illustrates an indirect reference i-node according to an exemplary embodiment of the present invention.
FIG. 9 is a table showing a file size for each page size according to an exemplary embodiment of the present invention.

FIG. 8 illustrates an indirect reference i-node 800 according to an exemplary embodiment of the present invention. Referring to FIG. 8, one index entry 810 of a plurality of index entries of the indirect reference i-node 800 refers to an i-node page 820 of another i-node, and the i-node page 820 refers to a plurality of data pages 831 through 835. The data pages 831 through 835, which are referred to, may be included in a block or a plurality of different blocks.

Each index entry of the indirect reference i-node 800 specifies a storage path of another i-node. The path search module 430 may refer to the data pages 831 through 835 included in a plurality of data blocks using a plurality of index entries included in another one or more i-nodes. That is, the index entries are configured in a tree form, and index entries in the lowest layer refer to data pages of a data block 320. Therefore, the indirect reference i-node node 800 can refer to a greater number of data pages of the data block 320 than the direct reference i-node 700.

FIG. 9 is a table showing a file size for each page size according to an exemplary embodiment of the present invention. The table shows an allowable file size according to page size and the type of i-node.

As described above, an i-node page may include metadata and one or more index entries. If the size of the i-node page is 512 bytes and the size of the metadata is 256 bytes, the size of the i-node page allocated to the index entries is 256 bytes. In this case, if the size of each index entry may be 4 bytes, there may be 64 index entries.

Similarly, if the size of the i-node page 600 (see FIG. 6) is 2 kilobytes and the size of metadata is 256 bytes, the size of the i-node page 600 allocated to index entries is 1792 bytes. Therefore, there may be 448 4-byte index entries.

In the case of the direct reference i-node 700 (see FIG. 7), 64 data pages can be referred to by 64 index entries. In this case, since the size of a data page is 512 bytes, a file with a size of 32,768 bytes, i.e., less than 32 kilobytes, can be found. If the size of a data page is 2 kilobytes, 448 data pages can be referred to by 448 index entries. Therefore, a file with a size of 917,504 bytes, i.e., 896 kilobytes, can be found.

In the case of the indirect reference i-node 800, the file size is determined by the number of layers of i-nodes which are referred to. Therefore, the file size is unlimited. In FIG. 9, random values are specified.

Figure 10:
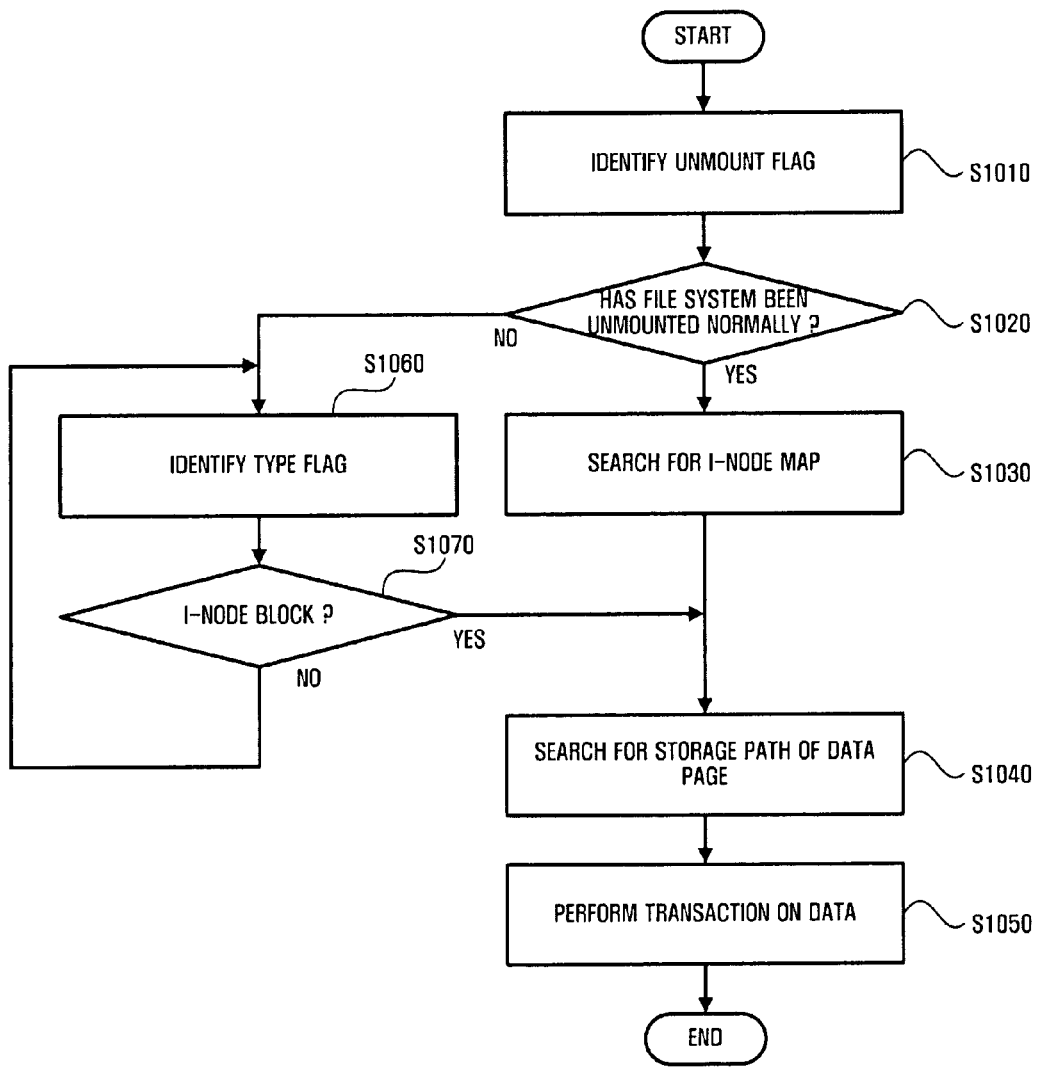
FIG. 10 is a flowchart illustrating a memory management process according to an exemplary embodiment of the present invention.

FIG. 10 is a flowchart illustrating a memory management process according to an exemplary embodiment of the present invention.

In order to manage the memory 300, the map search module 420 of the flash memory management apparatus 400 identifies an unmount flag stored in the spare region of the map block 310 (operation S1010) and determines whether the file system has been unmounted normally (operation S1020).

If the file system has been unmounted normally, the map search module 420 searches for an i-node map and then searches the i-node blocks 330 and i-nodes (operation S1030). As the i-nodes are searched, metadata and index entries can be referred to.

Accordingly, the path search module 430 searches for storage paths of data pages of the data blocks 320 with reference to index entries (operation S1040) and transmits the search results to the data management module 460, which, in turn, performs a transaction on data (operation S1050).

If the map search module 420 determines that the file system has been unmounted abnormally, the path search module 430 identifies a type flag specified in a spare region of a page located at the head of each block of the memory 300 (operation S1060). Then, the path search module 320 determines whether corresponding blocks are the i-node blocks 330 (operation S1070). If the corresponding blocks are the i-node blocks 330, the path search module 320 searches i-nodes stored in the i-node page 600. As the i-nodes are searched, the metadata and index entries can be referred to, and thus the storage paths of the data pages can be found (operation S1040). The data management module 460 receives the search result and performs a transaction on data (operation S1050).

Figure 11:
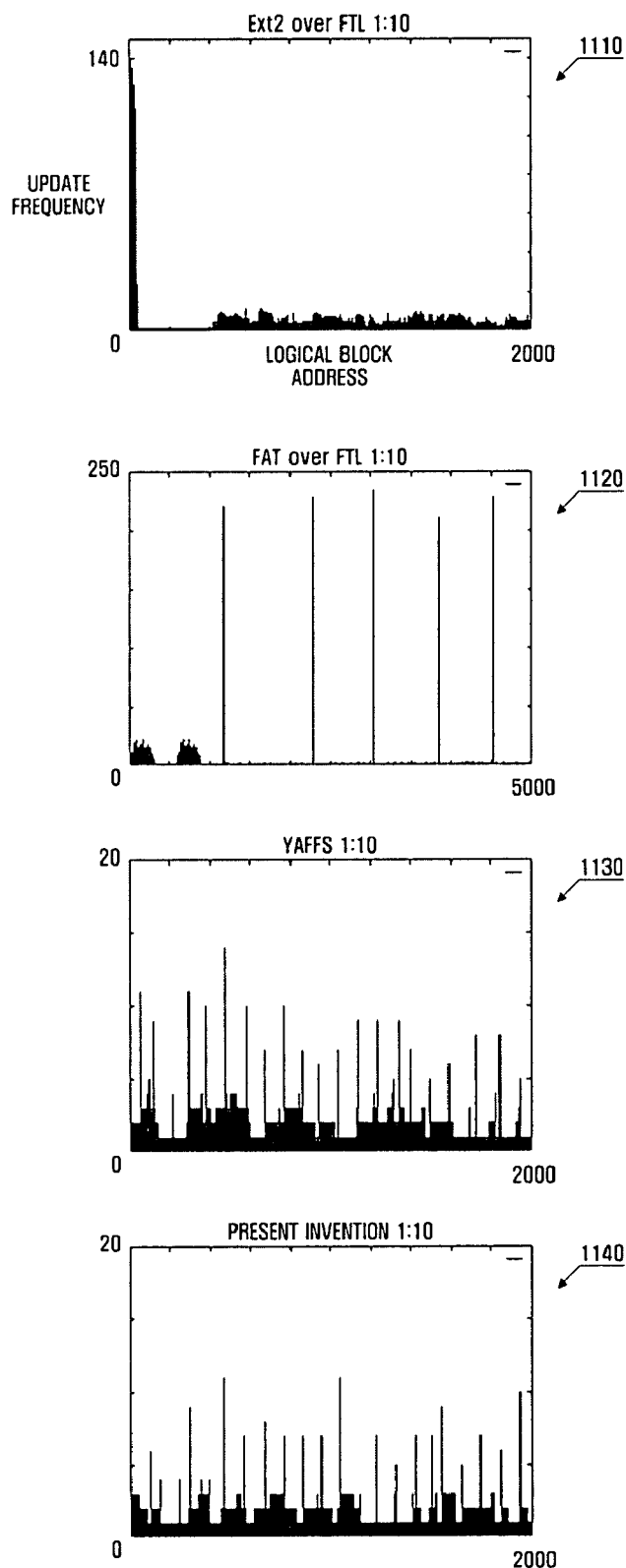
Figure 12:
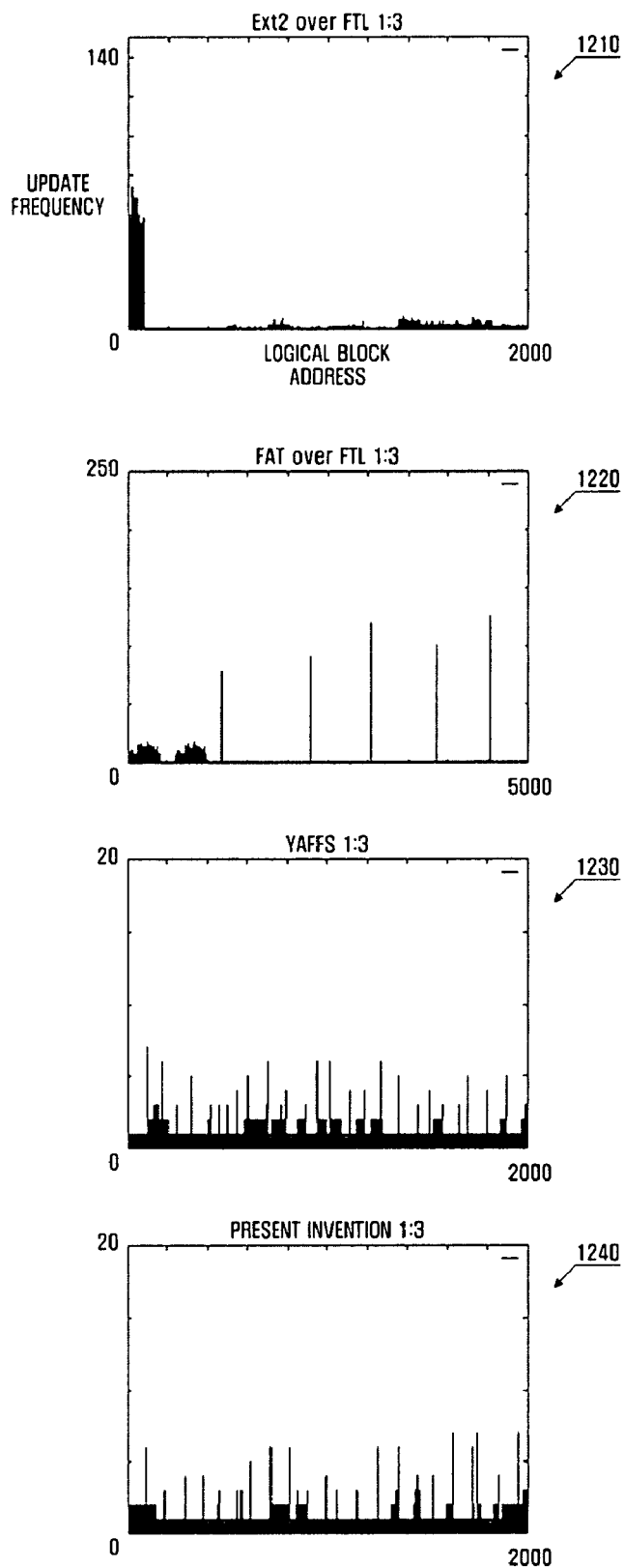
Figure 13:
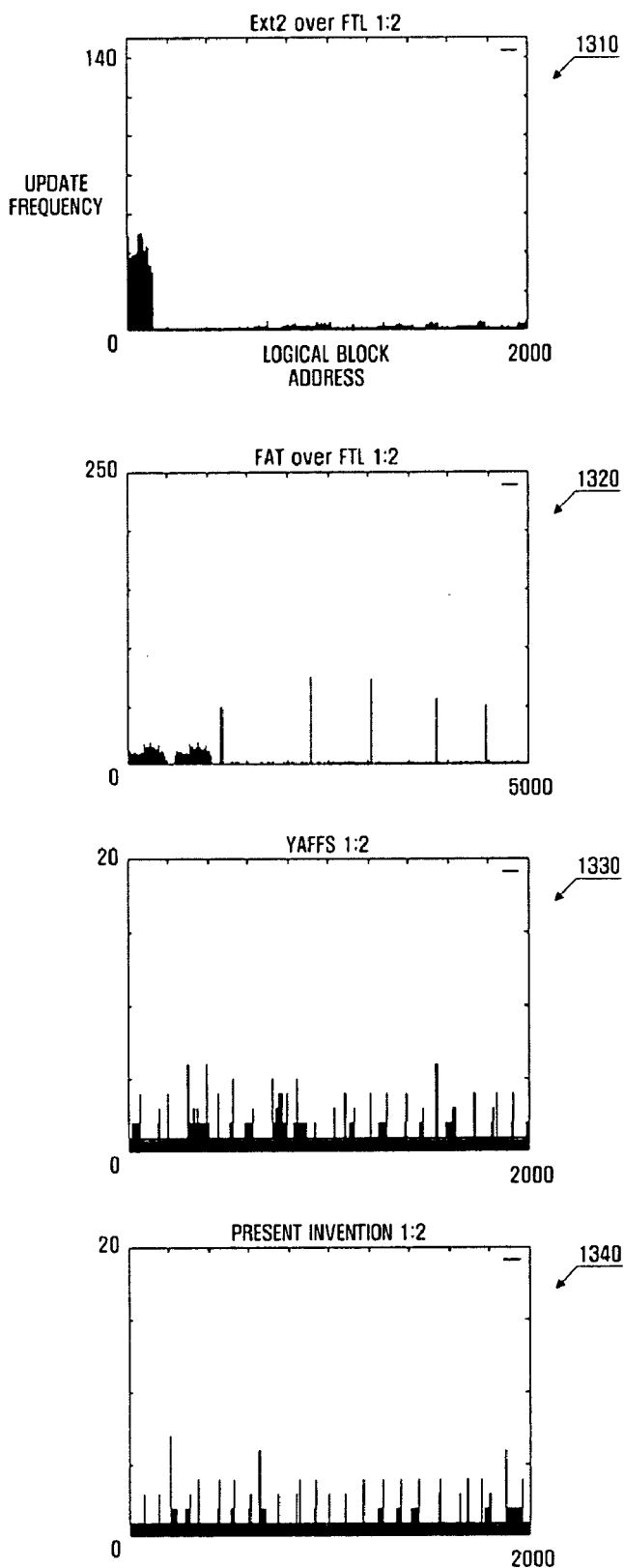

FIGS. 11 through 13 are graphs illustrating the results of garbage collection performance tests conducted using conventional flash memory management methods and a flash memory management method according to an exemplary embodiment of the present invention.

In these tests, a postmark benchmark program was used. The postmark creates a set of files with random sizes within a range set. The files are then subjected to transactions consisting of a paring of file creations or deletions with file reading or writing. Each pair of transactions is chosen randomly and can be biased via parameter settings.

The sizes of files were in the range of 512 bytes to 60 kilobytes, and the number of files was limited to 100 to 300. In addition, 1,000 transactions were made in a single operation, and each pair of transactions had the same probability.

In the respective tests, ratios of the number of files to the number of transactions were 1:10, 1:3 and 1:2. The results were collected according to each ratio.

In FIGS. 11 through 13, an X axis indicates a logical block address, and a Y axis indicates the distribution of write update frequency. Here, a logical block address corresponds to a page. As illustrated in FIGS. 11 through 13, each of conventional file systems, i.e., Ext2 1110 through 1310 and FAT 1120 through 1320, shows high update frequency in a narrow region of a logical block address, wherein the narrow region is where metadata is stored. In addition, as the ratio of files to transactions increases, the update frequency is increased, and the region of the logical block address is reduced.

On the other hand, each of conventional file systems, i.e., YAFFS 1130 through 1330, and file systems 1140 through 1340 according to the present invention has even distribution of update frequency over the entire region of the logical block address. The reason why each of Ext2 1110 through 1310 and FAT 1120 through 1320 shows high update frequency in the narrow region of the logical block address is that several i-nodes of each of Ext2 1110 through 1320 or FAT 1120 through 1320 share the same page.

FIG. 14 is a table 1400 showing the results of the performance tests of FIGS. 11 through 13. Specifically FIG. 14 shows additional write frequency for performing garbage collection according to a ratio of files to transactions.

Referring to the table 1400 of FIG. 14, a file system according to the present invention exhibits better performance than any conventional file system. This is because the file system according to the present invention has a garbage collection algorithm by which it can use a memory while referring to file system information. In addition, since the i-node blocks 330 are separated, the file system according to the present invention shows 9-20% better garbage collection performance than YAFFS.

FIG. 15 is a table 1500 showing the results of another performance tests conducted using related art flash memory management methods and a flash memory management method according to an exemplary embodiment of the present invention. In FIG. 15, a postmark/transaction ratio is 1:2.

Referring to FIG. 15, a file system according to the present invention requires less scanning time than conventional file systems.

The postmark/transaction ratio indicates the number of transactions, per second, performed by a postmark. It can be seen from the table 1500 that YAFFS and the file system according to the present invention show slightly better performance than JFFS2. This is because JFFS2 writes node containing i-node and data which cause some overhead in both i-node buildup and file storing. Also, JFFS2 writes data with compression.

The file system according to the present invention shows rather high page writing frequency because an i-node is indirectly referred to for a large file. Finally, the additional write frequency for each garbage collection by the file system according to the present invention has been reduced by 9-20%, as compared with the conventional file systems.

As described above, a flash memory management apparatus and method according to the present invention provide at least one of the following advantages.

First, blocks that form a memory are divided into data blocks and i-node blocks. In addition, storage paths of a data stored in the data blocks are respectively specified in the i-node blocks. Therefore, the pieces of data can be quickly accessed by searching the i-node blocks.

Second, since a different i-node corresponds to each file according to file size, the time required to search for a file can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A flash memory management apparatus comprising:
a map search module which searches for a map block, which comprises pages comprising storage paths of i-node blocks and a first flag indicating whether the storage paths of the i-node blocks have been updated, and is located at a position of a memory among blocks that form the memory, and extracts the storage paths of the i-node blocks from the map block if the storage paths of the i-node blocks are specified in the map block, based on the first flag;
a path search module which searches for storage paths of data specified in the i-node blocks based on an extraction result of the map search module; and
a data management module which accesses the data through a storage path of the data and performs a transaction on the data,
wherein each i-node block comprises a page comprising storage paths of pieces of the data and, if the storage paths of the i-node blocks are not specified in the map block, based on the first flag, the path search module extracts the pages included in the i-node blocks and searches for a storage path of the data included in a data region of the extracted pages, and
wherein one of a direct reference i-node and an indirect reference i-node is assigned for the data according to file sizes of the data.

2. The apparatus of claim 1, wherein the blocks that form the memory further comprise at least one of:
the i-node blocks; and
data blocks, wherein each of the data blocks comprises pages which store the data.

3. The apparatus of claim 1, wherein the path search module extracts the page included in each of the i-node blocks with reference to a second flag indicating a block type, which is included in a spare region of a page located at a head of each block of the memory.

4. The apparatus of claim 1, wherein the page included in each of the i-node blocks includes one of:
a direct reference i-node page specifying a storage path of a piece of data; and
an indirect reference i-node page specifying a storage path of a page which comprises storage paths of a plurality of pieces of data.

5. The apparatus of claim 1, wherein the map block comprises a block located at a head of the memory.

6. The apparatus of claim 1, further comprising a map update module which updates the storage paths of the i-node blocks included in the map block.

7. The apparatus of claim 6, wherein the map block comprises at least one of:
a list of the storage paths of the i-node blocks;
a number of i-node blocks; and
sizes of the i-node blocks.

8. The apparatus of claim 1, wherein the transaction comprises at least one of reading, writing, generating and erasing operations on the data.

9. A flash memory management method comprising:
searching for a map block, which comprises pages comprising storage paths of i-node blocks and a first flag indicating whether the storage paths of the i-node blocks have been updated, and is located at a position of a memory among blocks that form the memory;
extracting the storage paths of the i-node blocks from the map block, if the storage paths of the i-node blocks are specified in the map block, based on the first flag;
searching for storage paths of data specified in the i-node blocks based on a result of the extracting;
accessing the data through a storage path of the data; and
performing a transaction on the data,
wherein each i-node block comprises pages comprising storage paths of pieces of the data and the searching for the storage paths of data comprises:
extracting the pages included in the i-node blocks if the storage paths of the i-node blocks are not specified in the map block, based on the first flag; and
searching for a storage path of data included in a data region of the extracted pages,
wherein one of a direct reference i-node and an indirect reference i-node is assigned for the data according to file sizes of the data.

10. The method of claim 9, wherein the blocks that form the memory further comprise at least one of:
the i-node blocks; and
data blocks, wherein each of the data blocks comprises pages which store the pieces of data.

11. The method of claim 9, wherein the extracting the pages comprises extracting the page included in each of the i-node blocks with reference to a second flag indicating a block type, which is included in a spare region of a page located at a head of each block of the memory.

12. The method of claim 10, wherein the page included in each of the i-node blocks includes one of:
   a direct reference i-node page specifying a storage path of a piece of data; and
   an indirect reference i-node page specifying a storage path of a page which comprises storage paths of a plurality of pieces of data.

13. The method of claim 9, wherein the map block comprises a block located at a head of the memory.

14. The method of claim 9, further comprising:
   updating the storage paths of the i-node blocks included in the map block.

15. The method of claim 14, wherein the map block comprises at least one of:
   a list of the storage paths of the i-node blocks;
   a number of i-node blocks; and
   sizes of the i-node blocks.

16. The method of claim 9, wherein the transaction comprises at least one of reading, writing, generating and erasing operations on the data.

* * * * *